(12) United States Patent
D'athis et al.

(10) Patent No.: US 8,411,864 B2
(45) Date of Patent: Apr. 2, 2013

(54) METHOD OF MODIFYING SECRETS INCLUDED IN A CRYPTOGRAPHIC MODULE, NOTABLY IN AN UNPROTECTED ENVIRONMENT

(75) Inventors: Thierry D'athis, Versailles (FR); Philippe Dailly, Etrechy (FR); Denis Ratier, Draveil (FR)

(73) Assignee: Thales, Neuilly sur Seine (FR)

( * ) Notice: Subject to any disclaimer, the term of this patent is extended or adjusted under 35 U.S.C. 154(b) by 5 days.

(21) Appl. No.: 12/528,183

(22) PCT Filed: Feb. 27, 2008

(86) PCT No.: PCT/EP2008/052376
§ 371 (c)(1),
(2), (4) Date: Oct. 16, 2009

(87) PCT Pub. No.: WO2008/107351
PCT Pub. Date: Sep. 12, 2008

(65) Prior Publication Data
US 2010/0135496 A1    Jun. 3, 2010

(30) Foreign Application Priority Data

Mar. 6, 2007 (FR) ..................................... 07 01625

(51) Int. Cl.
*H04L 29/06* (2006.01)
(52) U.S. Cl. ....................................................... 380/277
(58) Field of Classification Search .................. 380/277; 705/41
See application file for complete search history.

(56) References Cited

U.S. PATENT DOCUMENTS

| | | | |
|---|---|---|---|
| 6,298,336 B1 * | 10/2001 | Davis et al. ..................... | 705/41 |
| 6,587,836 B1 * | 7/2003 | Ahlberg et al. ............ | 705/26.35 |
| 6,718,314 B2 * | 4/2004 | Chaum et al. .................. | 705/64 |
| 7,480,907 B1 * | 1/2009 | Marolia et al. ................ | 717/174 |
| 7,613,743 B1 * | 11/2009 | Giampaolo et al. .................. | 1/1 |

(Continued)

FOREIGN PATENT DOCUMENTS

EP      1688843      8/2006

OTHER PUBLICATIONS

GlobalPlatform Card Specification 2.1.1 (Mar. 2003).*

(Continued)

*Primary Examiner* — Jung Kim
*Assistant Examiner* — Theodore Parsons
(74) *Attorney, Agent, or Firm* — Strook & Stroock & Lavan LLP

(57) ABSTRACT

A method of modifying a set of secrets in a cryptographic module, to ensure that the modifying is either successful or invalid. The module includes readable version numbers for each secret and for the set of secrets. If the version number of the set of secrets is equal to a version number requiring the loading of a set of new secrets, the version number of the set of secrets of the cryptographic module is set to a distinctive number indicating that the cryptographic module is being reloaded. Next, for each secret, if the version number of the secret is different from the version number of the corresponding new secret to be loaded, the new secret and its version number are loaded. Next the version number of the set of secrets of the cryptographic module is set to the version number of the set of new secrets.

4 Claims, 1 Drawing Sheet

U.S. PATENT DOCUMENTS

| | | | |
|---|---|---|---|
| 2003/0188117 A1* | 10/2003 | Yoshino et al. | 711/164 |
| 2004/0003267 A1* | 1/2004 | Strom et al. | 713/193 |
| 2004/0123282 A1* | 6/2004 | Rao | 717/168 |
| 2004/0215755 A1* | 10/2004 | O'Neill | 709/223 |
| 2005/0018853 A1* | 1/2005 | Lain et al. | 380/277 |
| 2005/0027862 A1* | 2/2005 | Nguyen et al. | 709/225 |
| 2005/0047598 A1* | 3/2005 | Kruegel | 380/264 |
| 2005/0132179 A1* | 6/2005 | Glaum et al. | 713/1 |
| 2006/0161750 A1* | 7/2006 | Perkins et al. | 711/164 |
| 2006/0259207 A1* | 11/2006 | Natsume | 701/1 |
| 2007/0204304 A1* | 8/2007 | Kim | 725/51 |

OTHER PUBLICATIONS

Oestreicher, M.; "Transactions in Java Card", 15th Computer Security Applications Conference (ACSAC '99), pp. 291-298 (1999).*

GlobalPlatform Card-Specification v2-0-1 (Apr. 7, 2000).*

D.B. Johnson et al., Method for Validating a Key Data Set using a Modification Detection Code and a Tree Authentication Algorithm, IBM Technical Disclosure Bulletin, TDB v36 n4 Apr. 1993 p. 107-110 (Apr. 1, 1993).*

* cited by examiner

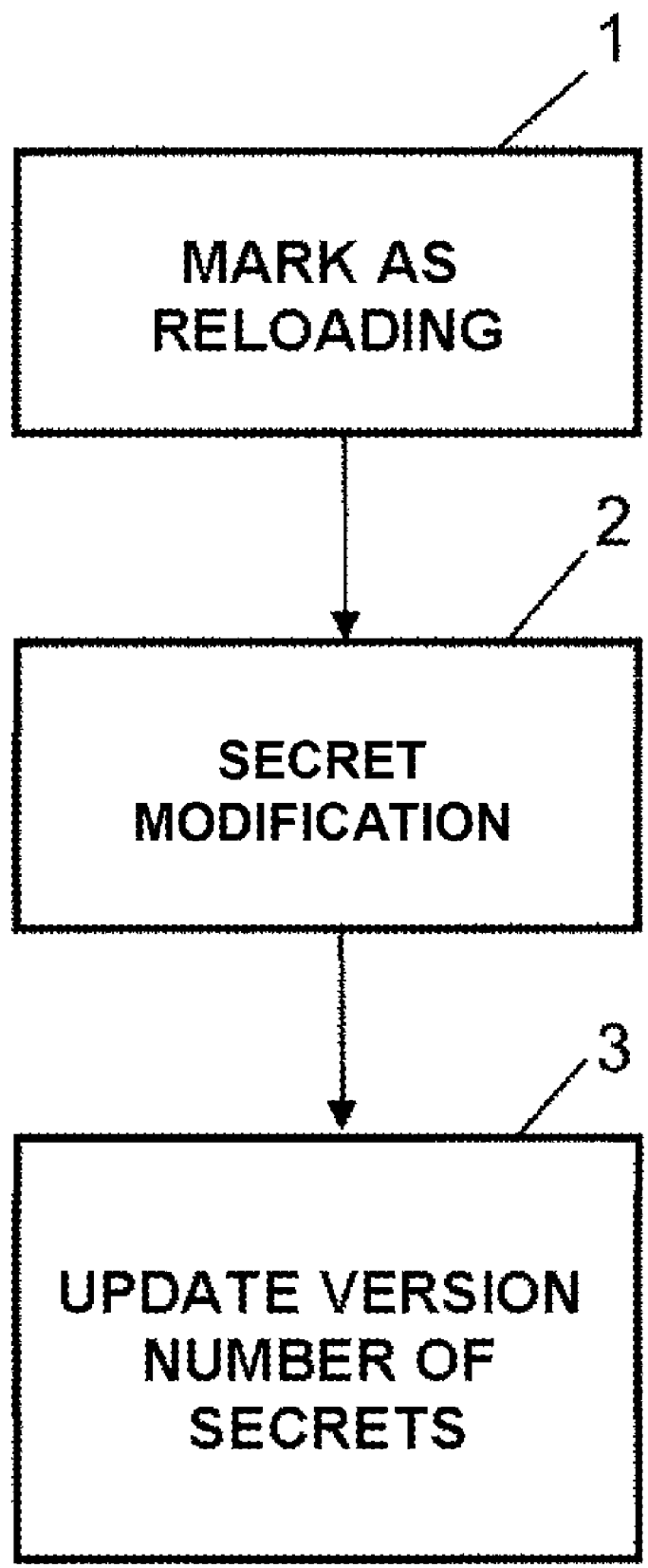

METHOD OF MODIFYING SECRETS INCLUDED IN A CRYPTOGRAPHIC MODULE, NOTABLY IN AN UNPROTECTED ENVIRONMENT

This is the U.S. National Phase Application under 35 U.S.C. §371 of International Application no. PCT/EP2008/05376, filed Feb. 27, 2008, which application claims the benefit of French Patent Application No. 07 01625, filed Mar. 6, 2007, both of which are incorporated by reference herein. The International Application was published in French on Sep. 12, 2008 as WO/2008/107351 under PCT Article 21 (2).

The invention relates to a method of modifying a set of secrets included in a cryptographic module. In particular, the invention applies to the reloading in an unprotected environment of access keys included in a set of chip cards.

In a system comprising a set of cryptographic modules (for example chip cards comprising cryptographic secrets), the management of the secrets included in the said modules is a complex task. In particular, the operation of updating the secrets must meet a certain number of security requirements. Hence, it is commonplace for the secrets to be updated in a secure environment, that is to say generally in secure premises, outside of the context in which the cryptographic modules are utilized. When the number of cryptographic modules is significant, this housekeeping operation is unwieldy and expensive.

Furthermore, in order to guarantee a correct security level, the cryptographic modules do not permit read and write access to the secrets. Should the process of updating the secrets suffer a failure, for example following an unintentional interruption to the process, it is not possible to resume and complete the process at the actual location where the latter has experienced such a failure.

The aim of the invention is notably to remedy the aforesaid drawbacks. For this purpose, the subject of the invention is a method of modifying secrets included in a cryptographic module. The cryptographic module guarantees that the loading of a secret is either successful, or invalid. The cryptographic module allows the reading of a version number for each secret. The cryptographic module comprises an information indicating a version number corresponding to the set of secrets. The method according to the invention comprises notably a first step in the course of which, if the version number of the set of secrets is equal to a version number requiring the loading of a set of new secrets, the version number of the set of secrets of the cryptographic module is rendered equal to a distinctive number making it possible to determine that the cryptographic module is being reloaded. The method according to the invention comprises a second step in the course of which, for each secret, if the version number of the said secret different from the version number of the corresponding new secret to be loaded, the new secret and its version number are loaded. The method according to the invention comprises a third step in the course of which the version number of the set of secrets of the cryptographic module is rendered equal to the version number of the set of new secrets.

In one embodiment, the version number of the set of secrets of the cryptographic module on the card is recorded in a file of the cryptographic module of the card accessible via an immutable secret.

In another embodiment, the version number of the set of secrets of the cryptographic module on the card is recorded in the form of a secret used only to indicate the global version of the secrets.

In another embodiment, the version number of the set of secrets of the cryptographic module on the card is recorded in the form of the last of the secrets to be reloaded in the second step.

In the course of the second step, the verification of the version number of each secret can notably be carried out by mutual authentication of the various secrets until the interruption point is found.

The invention has notably the advantages that it makes it possible to modify a set of secrets in a cryptographic module so as to guarantee the consistency thereof even when the updating may only be done secret by secret. The invention makes it possible to also guarantee that after reloading of the secrets within the cryptographic module, the data already present in the cryptographic module will continue to be accessible and uncorrupted.

Furthermore, the method according to the invention can be interrupted at any moment without this giving rise to corruption of the secrets included in the cryptographic module. Moreover, after one or more interruptions, intentional or accidental, in the course of the implementation of the steps of the method according to the invention, the method can still be implemented from the same machine or from a different machine able to track the implementation of the steps of the method.

Other characteristics and advantages of the invention will become apparent with the aid of the description which follows given in conjunction with the appended drawings which represent, FIG. 1, a schematic of the steps of the method according to the invention for modifying secrets included in a cryptographic module.

The method according to the invention makes it possible notably to resume and complete the modification of a set of secrets (sensitive data supplemented with their access keys), it not being possible for the said secrets to be reread, or necessarily rewritten.

In the embodiment of the method according to the invention, illustrated by FIG. 1, the cryptographic module comprising the secrets, which is manipulated in the course of the implementation of the steps of the method, has notably the following characteristics:

guarantee that the loading of a secret is either successful, or invalid (anti-tear principle);
  simultaneous updating of the secret and of its version;
  possibility of reading a version number for each secret, the said secret itself not being accessible;

The cryptographic module also comprises an information indicating a version number corresponding to the set of secrets.

A cryptographic module such as this can be for example a chip card, in particular a "Mifare® DESFire" card.

The method according to the invention receives as input a set of new secrets to be loaded instead of the secrets included in the cryptographic module. To the set of new secrets there corresponds a version number corresponding to the set of new secrets. Likewise, to the set of secrets included in the cryptographic module there corresponds a version number. To each secret included in the cryptographic module there corresponds a version number. To each new secret to be loaded there corresponds a version number. To each secret there therefore corresponds a version number. If the version numbers are identical then this implies that the secrets are identical. The same holds for the version number of the set of secrets.

The method according to the invention comprises a first step 1 in the course of which the cryptographic module is marked as undergoing reloading of secrets. Thus, in the course of the first step 1, after being assured if necessary that the reloading of the secrets has been requested, the version number of the set of secrets of the cryptographic module is read.

Next, the version number of the set of secrets of the cryptographic module is compared with the version number of the set of secrets to be loaded. This comparison determines whether it is necessary to load the new secrets (for example, the version number of the set of secrets to be loaded is greater than the version number of the set of already loaded secrets). If appropriate:

- the version number of the set of secrets of the cryptographic module is rendered equal to a distinctive number making it possible to determine that the cryptographic module is being reloaded;
- next, in the course of a second step 2 of the method according to the invention, for each secret, if the version number of the said secret is different from the version number of the new secret to be loaded, the corresponding new secret is loaded together with its version number;
- next, in the course of a third step 3 of the method according to the invention, the version number of the set of secrets of the cryptographic module is rendered equal to the version number of the set of new secrets.

In the course of the first step 1, if the version number of the set of secrets of the cryptographic module is equal to the distinctive number making it possible to determine that the cryptographic module is being reloaded, this signifies that it was not possible to complete the update operation beforehand. In this case:

- in the course of step 2, for each secret, if the version number of the said secret is different from the version number of the new secret to be loaded, the corresponding new secret is loaded together with its version number;
- then, in the course of step 3, the version number of the set of secrets of the cryptographic module is rendered equal to the version number of the set of new secrets.

Any interruption during these steps can be resumed so as to continue the reloading at the interrupted location, on the same machine, or on another machine.

The version number of the set of secrets of the cryptographic module on the card can be stored:

- either in a file of the card accessible via an immutable secret;
- or in the form of the version of a particular secret, that is to say:
    - either a secret which serves only to give the global version of the secrets;
    - or the last of the secrets to be reloaded in the step where the secrets are loaded in an agreed immutable order.

In particular, the method according to the invention can be applied to a pool of chip cards which can have version numbers of secrets which differ. This case arises notably when the set of chip cards corresponds to a batch, and when the secrets are data access keys. The method can be applied to a pool of sensitive terminals whose communication secrets must be changed in the field. The method according to the invention can further be applied to databases whose administration does not allow a change of rights of access in a single transaction.

In one embodiment, the verification of the version number of each secret (in particular when the latter is not available or is not readable) can be done by mutual authentication of the various secrets until the interruption point is found.

The invention claimed is:

1. A method of modifying secrets included in a cryptographic module on a card, the cryptographic module including a set version number that corresponds to a set of a plurality of secrets in the cryptographic module, wherein the cryptographic module:

indicates whether a loading of a secret is either successful, or invalid; and allows reading of a version number for each secret;

wherein the method comprises the steps of:

assigning a predetermined number to the set version number of the set of secrets of the cryptographic module, if the set version number of the set of secrets is equal to a version number that requires a set of new secrets to be loaded, in order to indicate that the cryptographic module is being reloaded;

for each secret in the set of secrets, loading a corresponding new secret and a version number of said new secret if a version number of the secret is different from the version number of the corresponding new secret to be loaded;

assigning a set version number of the set of new secrets to the set version number of the set of secrets of the cryptographic module;

wherein the set version number of the set of secrets of the cryptographic module on the card is recorded in a file of the cryptographic module of the card accessible via an immutable secret.

2. The method as claimed in claim 1, wherein the set version number of the set of secrets of the cryptographic module on the card is recorded as a secret used to indicate a global version of the secrets.

3. The method as claimed in claim 1, wherein the set version number of the set of secrets of the cryptographic module on the card is recorded as the last of the secrets to be reloaded in the step of loading the new secret and its version number.

4. The method as claimed in claim 1, wherein the loading of said new secret and its version number comprises verifying the version number of each secret by mutual authentication of one or more secrets until an interruption point is found.

* * * * *